United States Patent [19]

Hurnik et al.

[11] Patent Number: 5,067,443
[45] Date of Patent: Nov. 26, 1991

[54] MECHANICAL NURSING DEVICE FOR NEONATAL PIGLETS

[75] Inventors: Frank Hurnik, Rockwood; Eric Jarmain, Komoka; Don Phillips; Michael Kirkland, both of London; Douglas Harkes, Thamesford; Donald J. Gordon, Rockwood, all of Canada

[73] Assignee: Farmatic, Inc., Canada

[21] Appl. No.: 590,235

[22] Filed: Sep. 28, 1990

[30] Foreign Application Priority Data

Sep. 29, 1989 [CA] Canada .................................. 614921

[51] Int. Cl.$^5$ .............................................. A01K 9/00
[52] U.S. Cl. .................................... 119/71; 119/51.11
[58] Field of Search ........................... 119/71, 72, 51.11

[56] References Cited

U.S. PATENT DOCUMENTS

| | | | |
|---|---|---|---|
| 3,037,481 | 6/1962 | Kloss | 119/71 |
| 3,089,463 | 5/1963 | Grunzke | 119/71 |
| 3,090,355 | 5/1963 | Gains | 119/71 |
| 3,122,130 | 2/1964 | Brown et al. | 119/71 |
| 3,307,521 | 3/1967 | Tavera et al. | 119/71 |
| 3,352,286 | 11/1967 | Pickelsimer | 119/51.11 |
| 3,524,432 | 8/1970 | Tartar | 119/51.11 |
| 3,628,506 | 12/1971 | Glasbergen | 119/51.11 X |
| 3,664,302 | 5/1972 | Wienert | 119/18 |
| 3,664,302 | 5/1972 | Wienert | 119/18 |
| 4,541,361 | 9/1985 | Holter . | |
| 4,620,505 | 11/1986 | Thomson et al. | 119/71 |

FOREIGN PATENT DOCUMENTS

| | | | |
|---|---|---|---|
| 929814 | 4/1969 | Canada | 119/71 |
| 0119783A3 | 9/1984 | European Pat. Off. . | |
| 1237379 | 8/1965 | Fed. Rep. of Germany | 119/71 |
| 2092876A | 8/1982 | United Kingdom . | |
| 2130108A | 5/1984 | United Kingdom . | |

Primary Examiner—John G. Weiss
Assistant Examiner—R. Thomas Price
Attorney, Agent, or Firm—Andrus, Sceales, Starke & Sawall

[57] ABSTRACT

A mechanical electronically controlled nursing apparatus for neonatal piglets which is capable of nursing up to sixteen piglets simultaneously. The apparatus operates semi-automatically and includes a refrigerated storage tank with a magnetic stirrer for storing a twenty-four hour supply of liquid feed formula, a pair of heating tanks for heating the formula to body temperature before nursing, and two nipple bars which accommodate four nipples each and are disposed along each side of the apparatus. The nipple bars are supported by nipple bar supports which are pivotally mounted within the apparatus to permit the nipples to be extended through holes provided in the housing of the apparatus for nursing and retracted into the housing to prevent damage to the nipples resulting form piglet play behavior. The apparatus further reproduces the digitized grunting sounds of a nursing sow during each nursing period. Two heat lamps are preferably suspended on each side of the apparatus and powered through receptacles provided on the apparatus. One heat lamp is suspended over a rest area remote from the apparatus and the other is suspended adjacent the nipple area of each side. The heat lamps over the rest areas are turned on between nursing periods and the heat lamps over the nipple areas are turned on during nursing periods to further condition piglet behavior.

12 Claims, 8 Drawing Sheets

MECHANICAL NURSING DEVICE FOR NEONATAL PIGLETS

BACKGROUND OF THE PRESENT INVENTION

The present invention relates to mechanical devices for nursing newborn animals and, in particular, to a mechanical nursing apparatus which functions as a surrogate mother for neonatal piglets.

Infant mortality among farm animals, especially piglets is a recognized problem in the farm industry. An average of 15 to 25% of all farm raised piglets are lost before they are weaned from their mothers. Such mortality is due to a number of factors, including:

oversized litters;

undersized or weak individuals unable to effectively compete for food;

sows having non-functional teats or suffering from a nursing infection;

cannibalistic or irresponsible sows; and piglets orphaned by a sow lost during delivery.

There has been a long felt need for a reliable mechanical apparatus capable of nursing neonatal piglets in a relatively unattended manner. There have been numerous inventions which relate to such an apparatus. The following United States Patents are known to disclose nursing feeders for piglets or other suckling animals:

Kloss U.S. Pat. No. 3,037,481
Grunzke U.S. Pat. No. 3,089,463
Gains U.S. Pat. No. 3,090,355
Brown et al. U.S. Pat. No. 3,122,130
Travera et al. U.S. Pat. No. 3,307,521
Pickelsimer U.S. Pat. No. 3,352,286
Winert U.S. Pat. No. 3,664,302
Holter U.S. Pat. No. 4,541,361

In addition, two British and one European patent applications are known to relate to this subject matter. They include:

GB 2 092 867—Holman
GB 2 130 108—Spencer
EP 0 119 783—McAuliffe

Known prior art nursing apparatus' have often proven unsuccessful in operation. Among the requirements for a successful nursing apparatus are:

Sanitation: Newborn animals are particularly sensitive to bacterial infection. Most bacteria thrive in a warm liquid feed formula environment. Unless a nursing apparatus is so designed that a thorough rinsing of all parts exposed to formula is performed after each nursing cycle, the apparatus is apt to become a breeding ground for bacterial cultures which can induce scours or similar infections that contribute to piglet mortality.

Proper storage and maintenance of nursing formula: In order to obviate frequent attention to a nursing apparatus, a storage container that accommodates at least a twenty-four hour supply of formula is required. This poses two potential problems, namely the separation of the formula into its lighter and heavier components and the temperature control of the stored formula. It is well known that liquid feed formula suspensions tend to separate into lighter and heavier components if allowed to stand for extended periods of time. It is also well known that unless nursing formulas are stored in a properly cooled environment, they quickly become contaminated with bacterial cultures which may give rise to the health problems as described above.

Protection of nursing nipples: In the prior art nursing apparatus' listed above, the nursing nipples are constantly available to a nursing animal unless the animal is removed from the nurse site between nursing periods. Nursing animals, especially piglets, are very aggressive with nursing nipples and are inclined to destroy nipples in a short period of time. Piglets also tend to use nipples for purposes other than nursing. For instance, young piglets quickly learn to use a nipple for showering if milk is still available once they have satisfied their hunger. This leads to a waste of expensive formula and contributes to an unsanitary environment.

Proper metering and efficient use of formula: Most prior art apparatus provide some sort of formula metering, however, the metering must either be accomplished by hand or is, at best, approximate. Unless a precise metering of formula can be ensured, an optimal growth of piglets and efficiency in the use of formula are impossible to achieve.

Environmental control and surrogate functions: Most prior art apparatus ignore the fact that, in order to raise orphaned piglets without the development of behavioral aberrations, the piglets must be fed on a regular schedule and each feeding period must be accompanied by consistent stimuli and in a clean and relatively tranquil environment. Although certain prior art nursing apparatus are equipped with timers and reproduce the grunting sounds of a nursing sow, these apparatus' suffer one or more of the disadvantages listed above.

Reliable operation in the hostile environment of a livestock barn: The atmosphere in livestock barns is known to be humid and often contains high concentrations of air borne ammonia. Such an atmosphere is quite corrosive. Prior art nursing apparatus' often fail to operate reliably in a livestock barn because they are not properly protected from corrosion, or they are too complex to operate for long periods of time when exposed to adverse environmental conditions.

It is an object of the present invention to provide a nursing apparatus which overcomes the shortcomings of the prior art.

SUMMARY OF THE PRESENT INVENTION

It is a further object of the invention to provide an apparatus for nursing neonatal piglets which accomplishes same with efficiency and a minimum of operator attention.

It is a further object of the invention to provide a nursing apparatus for neonatal piglets which is substantially self-cleaning, and reliably functional.

A preferred embodiment of a nursing apparatus in accordance with the invention provides a self-contained, portable unit which performs the surrogate functions of a nursing sow on a programably controlled, twenty-four hours a day basis. The apparatus includes a rectangular fiberglass housing which surrounds and supports a refrigerated liquid feed formula storage tank, a pair of temperature controlled formula heating tanks, a metering peristaltic pump for transferring formula from the storage tank to the heating tanks, a pair of opposing pivotally mounted nipple bars located along the interior of each lower longitudinal edge of the apparatus, and a solid state electronic control unit. The apparatus stores a supply of liquid feed formula in its refrigerated storage tank. The formula in the storage tank is stirred on a periodic schedule to ensure that there is no separation of fat from the formula mix. Once each hour, an operator selectable quantity of formula, calculated from the age and number of piglets being fed, is pumped to each heating tank where the formula is heated to body temperature. After body temperature is attained, the apparatus commences digitized grunting sounds to alert the piglets that feeding is about to commence. Nipples which are equally spaced along the outer edge of each nipple bar are pivoted outwardly to extend through holes in each side of the housing a short time before the feed formula is released to the nipple bars. This conforms with the natural nursing process whereby piglets must briefly stimulate a sow's nipples before milk is let down by the nursing sow. The warmed formula is then released to the nipples. The digitized grunts are simultaneously speeded up to indicate to the piglets that the milk is being let down. The piglets are allotted three minutes for nursing during each nursing period. When the three minute nursing period has expired, the nipples are slowly retracted into the housing of the apparatus so that they are unavailable for the play behavior of the piglets which inevitably leads to the eventual destruction of the nipples.

In addition to the digitized grunting sounds produced by the apparatus, two pairs of heat lamps are manipulated to further condition the piglets' behavior. One lamp of each pair is preferably suspended over a rest area some distance from each side of the nursing apparatus, and the other lamp of each pair is suspended directly over the nipple area on each side of the apparatus. Only one lamp of each pair is lighted at any given time. The lamps over the rest areas are lighted between the nursing periods of each cycle and the lamps over the nipple areas and lighted during the nursing period of each cycle. Thus piglet attention is directed away from the nursing apparatus between the nursing period of each hourly cycle.

In more general terms, a mechanical nursing apparatus for neo-natal piglets in accordance with the present invention comprises:
a housing for surrounding and supporting the components of the mechanical nursing apparatus, including:
a refrigerated tank for holding a supply of fluid feed formula; means for periodically agitating the fluid feed formula in said tank; at least one heating tank in fluid communication with said storage tank;
metering means disposed in the fluid communication path between said storage tank and said heating tank for displacing a predetermined quantity of fluid feed formula into said heating tank;
means for distributing liquid feed formula to at least one nursing nipple, said means being in fluid communication with said heating tank;
a valve for controlling the flow of liquid feed formula from said heating tank to said means for distributing same;
protractor means for displacing said nursing nipple from a first position within said housing wherein said nipple is inaccessible for nursing, to a second position wherein said nipple extends through an opening in said housing and is available for nursing; and
an electronic logic circuit for semi-automatically controlling the functioning of said nursing apparatus.

BRIEF DESCRIPTION OF THE DRAWINGS

A preferred embodiment of the present invention will now be explained by way of example only and with reference to the following drawings wherein.

DESCRIPTION OF THE ILLUSTRATED EMBODIMENT

Figure 1:
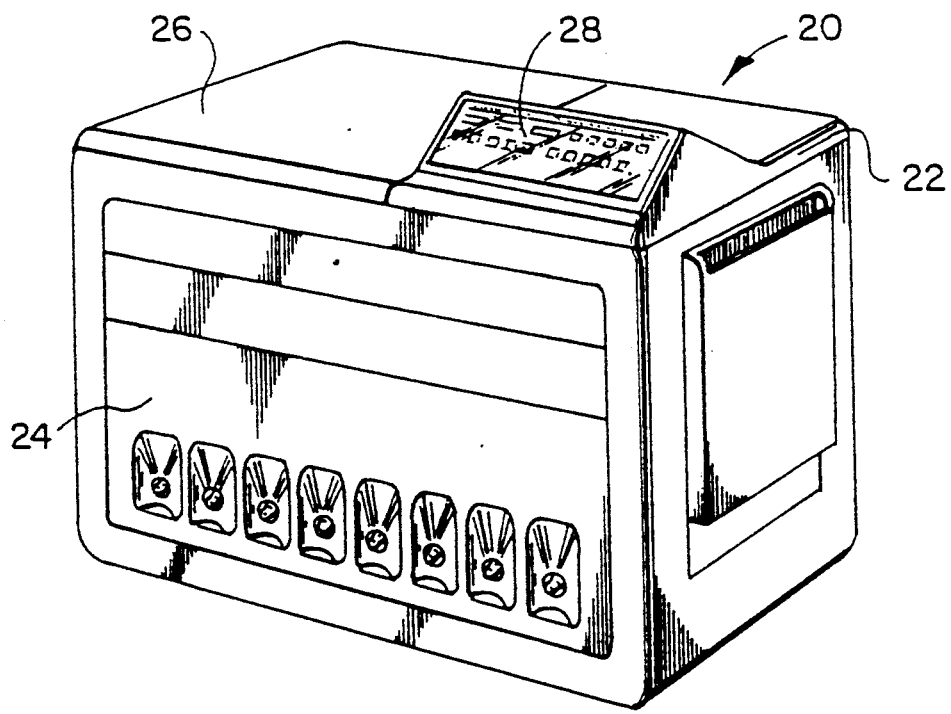
FIG. 1 is a perspective view of a mechanical nursing apparatus for neonatal piglets in accordance with a preferred embodiment of the invention.

As shown in FIG. 1, a preferred embodiment of a mechanical nursing apparatus in accordance with the invention is generally indicated by the reference 20. The nursing apparatus includes a housing 22, preferably constructed from molded fiberglass or a rigid plastic to prevent corrosion. The housing is provided with removable side panels 24 to permit access to the interior of the apparatus for set-up and maintenance. The apparatus further includes a hinged top cover 26 which covers the storage tank and heating tanks in its closed condition, and an operator's panel 28 which is used to program and monitor the operations of the apparatus.

Figure 2:
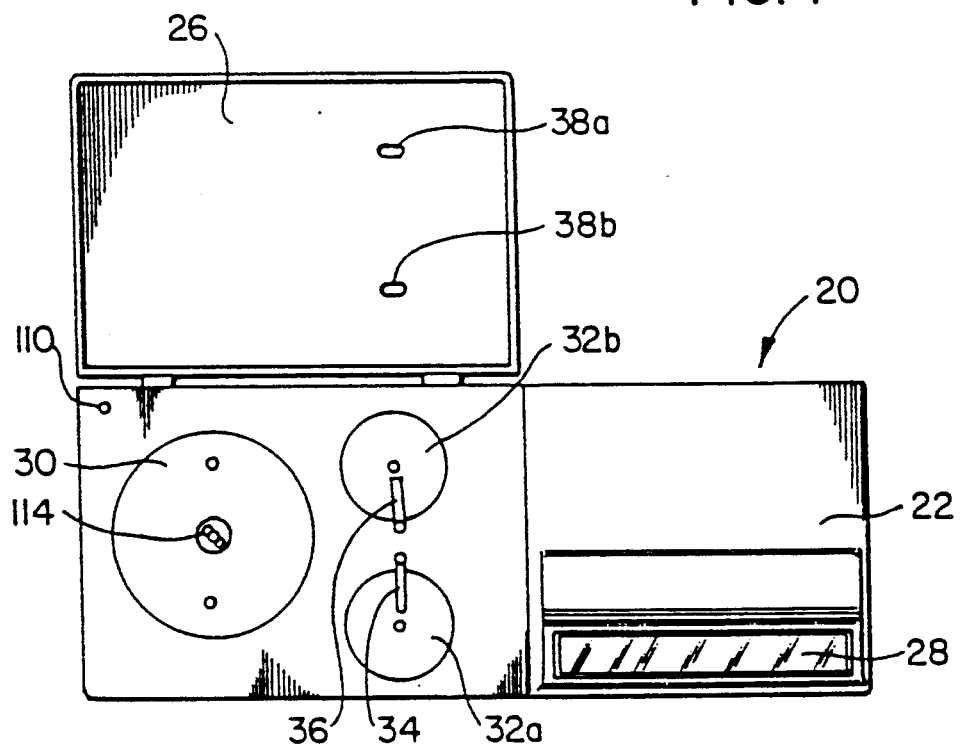
FIG. 2 is a top plan view of the apparatus shown in FIG. 1 with the cover open to expose the storage tank and heating tanks of the apparatus.

In FIG. 2, the nursing apparatus 20 is shown in top plan view with the top cover 26 in an open condition. As is apparent, the top cover 26 normally closes a refrigerated storage tank 30, the construction and operation of which will be discussed below in relation to FIG. 3. Adjacent the refrigerated storage tank 30 are two heating tanks 32a and 32b. Heating tanks 32a and 32b are supplied with formula to be heated through a pair of tubes 34 and 36, as will be explained in relation to FIG. 4. The ends of hoses 34 and 36 are directed downward into heating tanks 32a and 32b by a pair of raised areas 38a and 38b on the inside of top cover 26. This ensures that the fluid pressure developed during the transfer of formula from the storage tank 30 to heating tanks 32a and 32b does not force the ends of hoses 34 and 36 upward to discharge outside of the heating tanks.

Figures 3, 4:
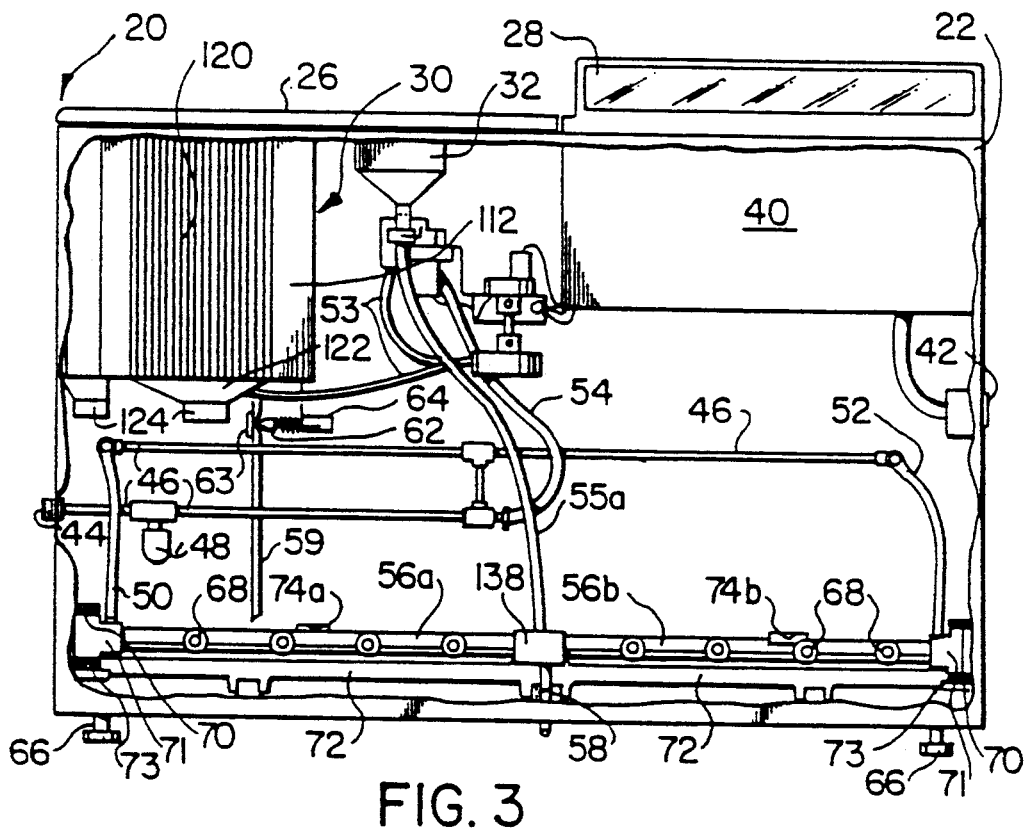
FIG. 3 is a cut-away front elevational view of the apparatus shown in FIG. 1.
FIG. 4 is a detailed cross-sectional view showing the arrangement of the heating tanks and the valves for controlling the flow to and from the heating tanks.

FIG. 3 shows a cut-away side elevational view of the apparatus, the opposite side being essentially a mirror image of the side illustrated. As noted above, the apparatus includes a fiberglass housing 22 which is provided with a top cover 26 and a touch sensitive control panel 28. Contained within the housing 22 beneath the control panel 28 is a compartment 40 which encloses the power supply (not illustrated) and the solid state control circuit which will be described in more detail in relation to FIGS. 10-13. Attached to and supported by compartment 40 is the peristaltic pump and flow control unit described in more detail in relation to FIGS. 4, 5 and 6. The apparatus further includes a switched electrical outlet 42, the function of which will be explained in more detail in relation to FIG. 14.

In order to minimize the probability of bacterial contamination, a rinse water supply fitting 44 is provided on one end of the machine. The rinse water supply fitting 44 accommodates the connection of a standard ½ inch water hose. Connected to fitting 44 are rinse water supply pipes 46, preferably assembled from standard ½ inch PVC plumbing parts, for distributing rinse water to the various components of the apparatus. Supply pipes 46 are interrupted near the supply fitting 44 by an electrically operated valve 48, well known in the art. The valve 48 is opened after each nursing period to provide a supply of fresh water for rinsing the components of the apparatus exposed to heated nursing formula. When valve 48 is opened, fresh water enters rinse tubes 50 and 52, connected to the opposing ends of each nipple bar 56a and 56b respectively. Water is also simultaneously delivered to the heating tanks 32a and 32b via tube 54. The rinse water drains from nipple bars 56a and 56b via a drain hose 58, the control of which will be described hereinafter in more detail. After the rinse water introduced to the nipple bars via tubes 50 and 52 has drained, the rinse water in the heating tanks 32a and 32b is released via tubes 55a and allowed to drain through hose 58.

Storage tank 30 is also provided with a drain tube 59. Tube 59 is maintained in a normally closed condition by a nylon wedge-shaped drain control valve 62 which pinches the tubing against a backing plate 63. The drain control valve 62 can be retracted from the backing plate to permit fluid flow through tube 59 by actuation drain of a control switch 110 connected to an electric solenoid 64. The drain control switch 110 is located under top cover 26 adjacent the left rear side of the storage tank 30 (see FIG. 2).

The fiberglass housing 22 is supported on adjustable feet 66 which threadedly engage fittings in housing 22. In order to ensure the equal distribution of liquid feed formula to each nipple 68, nipple bars 56a and 56b must be as level as possible. The nipple bars are leveled by screwing the adjustable feet 66 inwardly or outwardly to obtain approximate level. Further leveling of nipple bars 56a and 56b is accomplished using the leveling screws located on the outer end of each nipple bar. The entire nipple bar assembly is supported by a pivotally mounted nipple bar support 72 which will be described in relation to FIGS. 8 and 9. The leveling screws are elongated plastic screws which pass completely through the terminal fittings 71 of each nipple bar and engage threaded holes in each end of the nipple bar support 72. Each nipple bar, 56a and 56b respectively, may be individually leveled by loosening locking knobs 70 and turning leveling knobs 73, located under terminal fittings 71, while referring to the appropriate spirit level 74a or 74b which are permanently affixed to the respective nipple bars.

Formula is supplied to the nipple bars from heat tanks 32a and 32b via heat tank drain tubes 55a and 55b, as shown in FIG. 4. Heat tanks 32a and 32b are preferably epoxy, enamel or plastic lined aluminum tanks having thermostatically controlled resistance type electric heaters, well known in the art. The flow of liquids to heat tanks 32a and 32b is controlled by a flow control unit 76 which is powered by a reversible electric direct current motor 78. Direct current motor 78 drives a cam (not illustrated) which alternately closes tube 34 or tube 36 by pinching the tube against a side wall of the rectangular box-shaped flow control unit 76. Tubes 34 and 36 are interconnected by an X-shaped four way connector 80. Connector 80 is, in turn, connected to rinse water supply tube 54 and formula supply tube 53. Flow from heating tanks 32a and 32b is controlled by a second reversible electric direct current motor 82 which is mounted to a gear box 84. Gear box 84 is equipped on its output shaft with an L-shaped swivel arm 86 (see FIG. 5) which is connected to an elongated rod 88, provided on each of its ends with a nylon wedge 90 (refer again to FIG. 4) which pinches tubes 55a and 55b against an elongated rectangular steel bracket 92. The bracket 92 is bent on each end to provide a rigid flat backing plate which permits tubes 55a and 55b to be repeatedly pinched closed without danger of damaging the tubes. It should be noted that all tubing used in the apparatus is preferably silicone tubing which has excellent deformation recovery properties and may be pinched closed for extended periods of time without permanent deformation, kinking or adhesion of the inner walls.

Figure 5:
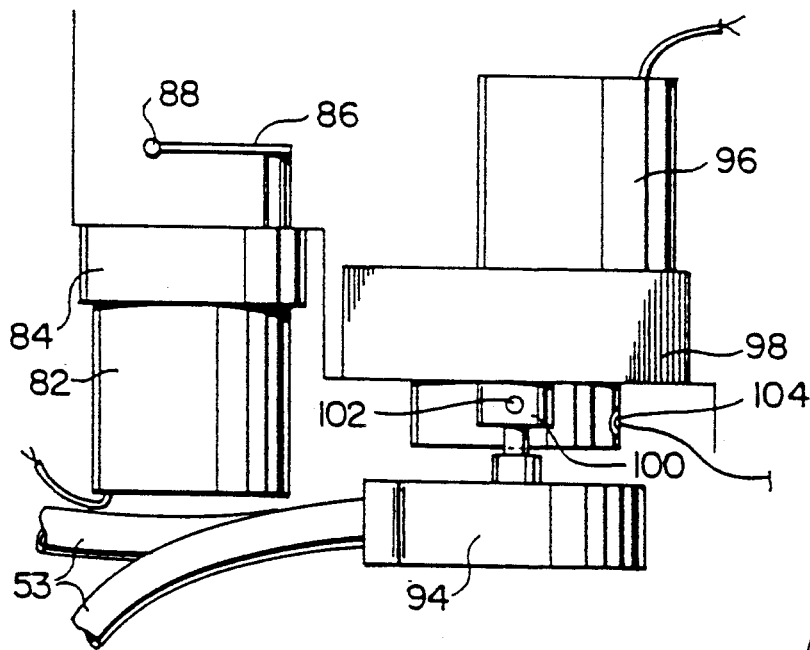
FIG. 5 is a detailed view of the peristaltic pump support bracket and the peristaltic pump sensor.

As shown in FIG. 5, a peristaltic pump 94 is driven by an electric motor 96. Motor 96 is attached to a reduction type gear box 98. The output of gear box 98 is connected to a shaft 100, having two small magnets 102 attached respectively to its opposing sides. Surrounding shaft 100 is a housing, preferably a plastic housing, which supports a Hall Effect sensor 104. The Hall Effect sensor 104 detects the passage of magnets 102 in a manner well known in the art. Whenever a magnetic field is passed over a Hall Effect sensor, the sensor turns to ground and the resulting electrical pulse is readily used to count each half revolution of the shaft 100. This count is used in determining the volume of formula pumped from the storage tank 30 to either heating tank 32a or 32b, as will be explained in more detail hereinafter.

Figure 6:
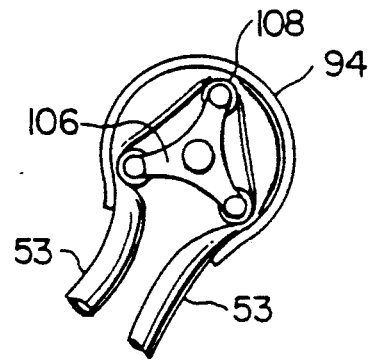
FIG. 6 is a detailed plan view of the peristaltic pump.

Peristaltic pump 94 includes a triangular frame 106 provided with roller bearings 108 on each of its corners, as shown in FIG. 6. Roller bearings 108 pinch silicone tube 53 against the sides of a circular plastic or metallic cage 94. Because of the inherent resiliency of the silicone tubing 53, the peristaltic pump reliably delivers a specific volume of fluid with each revolution if a .precision cast, tubing, well known in the art and widely available, is used. The volume delivered by the pump depends, of course, on the diameter of tubing 53, and the diameter of the cage 94. The throughput of the pump is consistent and can be used as a constant in the control logic circuit for metering a specific volume of nursing formula to each of the heating tanks 54a and 54b.

Figure 7:
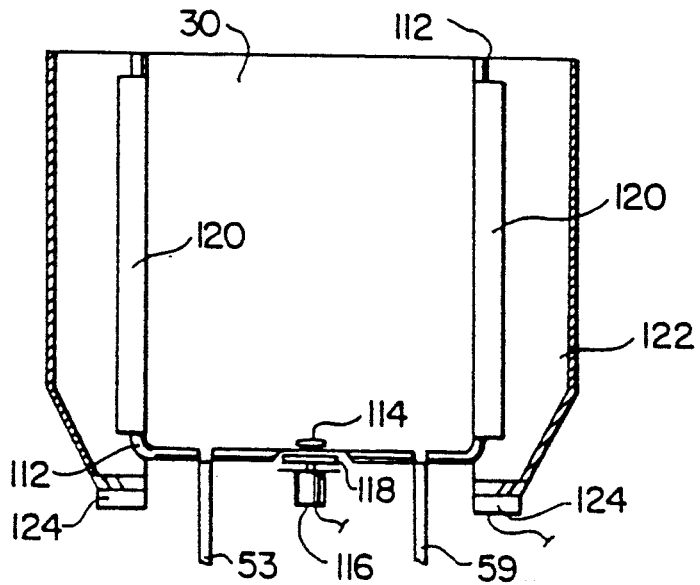
FIG. 7 is a cross-sectional detail of the storage tank of the apparatus shown in FIG. 1.

FIG. 7 illustrates a detailed cross-section of storage tank 30. As is apparent, there are two outlet tubes connected to the bottom of the tank 30. A first tube 53 is connected to the peristaltic pump 94 (see FIG. 3) and the second tube 59 is held normally closed by a nylon wedge 62 which may be retracted by an electric solenoid 64 (see FIG. 3), as explained above. Electric solenoid 64 is opened on demand when storage tank 30 requires draining. The solenoid 64 is actuated by manually pressing a drain control switch 110 located under cover 26 in a corner of the apparatus adjacent storage tank 30. Storage tank 30 is preferably an epoxy, enamel or plastic lined aluminum storage tank which is insulated with a foamed insulation 112. Insulation 112 may be a stable spray-on foam or a flexible sheet foam glued to the exterior surface of the storage tank.

The fluid feed formula in storage tank 30 must be agitated periodically and refrigerated. In order to minimize the probability of wear and/or corrosion, a magnetic stirrer is provided. The magnetic stirrer includes a stirring pellet 114 which is a short cylindrical steel rod that is coated with a wear resistant plastic such as polyethylene or polyvinyl chloride. Positioned under the centre point of storage tank 30 is an electric motor 116, the shaft of which is connected to a bar magnet 118. The bar magnet 118 rotates in a plane parallel with the bottom of the storage tank 30. When the bar magnet is rotated by electric motor 116, the stirring pellet 114 is likewise rotated in storage tank 30. The rapid rotation of stirring pellet 114 creates adequate turbulence in the tank to prevent the separation of formula into its fatty and water soluble components. The control logic circuit of the apparatus operates electric motor 116 on a three minutes on, three minutes off schedule. This magnetic stirrer provides for reliable mixing of liquid feed formula while minimizing the probability of corrosion due to the failure of the seals and bearings required by more conventional stirrers.

As noted above, storage tank 30 must also be refrigerated. As is well known, the compressors required for standard freon based refrigeration units are noisy and relatively expensive to manufacture and maintain. In order to minimize noise and maximize reliability, the storage tank 30 is provided with three refrigeration units 120 which function in accordance with the Peltier Effect. The refrigeration units 120 include a first aluminum plate bonded to the aluminum storage tank. Two commercially available Peltier Effect ceramic sandwich cells are bonded to the first aluminum plate. A heavy aluminum plate having vertical cooling fins (see FIG. 3) is in turn bonded to the Peltier Effect ceramic cells. It is well known in the art that when a current is passed in the proper direction through the ceramic cells of the refrigeration unit 120, the one side of each cell becomes cold and the other side becomes warm. The refrigeration units 120 are so constructed that the cold side of each cell is adjacent the storage tank 30 and the hot side is adjacent the heavy aluminum plate with the vertical cooling fins. A combination of three such refrigeration units 120 affixed to the outside of storage tank 30 is sufficient to maintain the formula in an adequately cool condition even when ambient temperatures rise to 40° C. A shroud 122, which is provided on its bottom end with a blower 124, surrounds each of the three refrigeration units 120. The blowers 124 constantly circulate air over the cooling fins of the refrigeration units 120 to carry away heat extracted from the formula in the storage tank 30. Thus a quiet, efficient refrigerated storage tank is provided which has no moving parts except from the moving parts of blowers 124.

Figure 8:
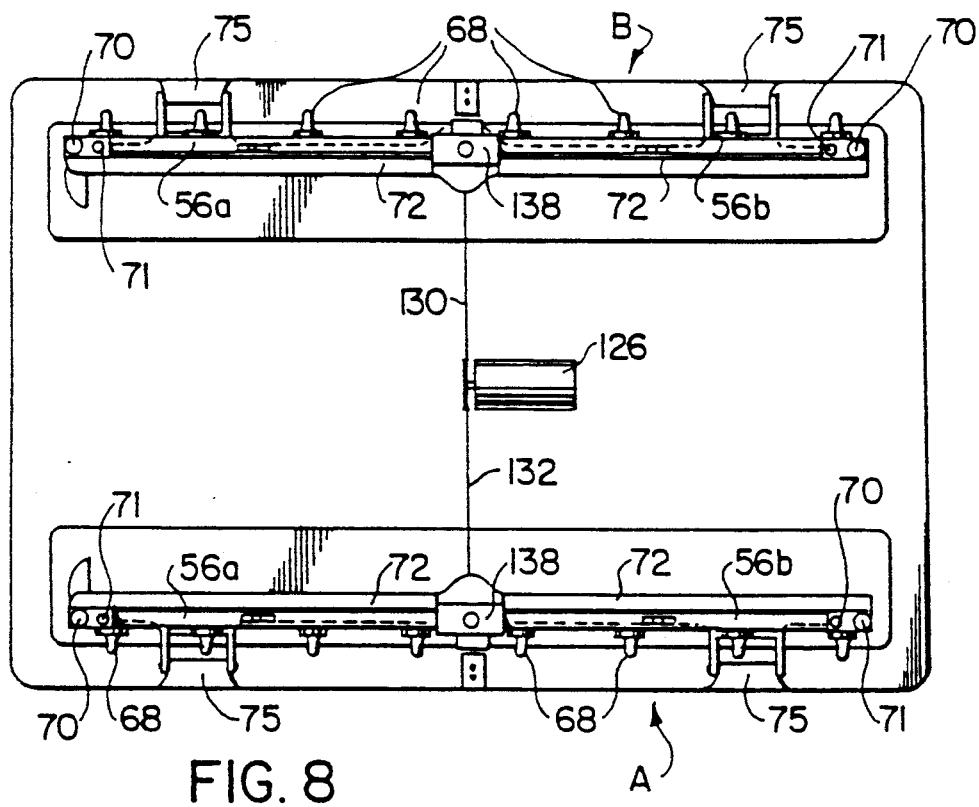
FIG. 8 is a plan view of the nipple bars and nipple bar protractor of the apparatus shown in FIG. 1.
Figure 9:
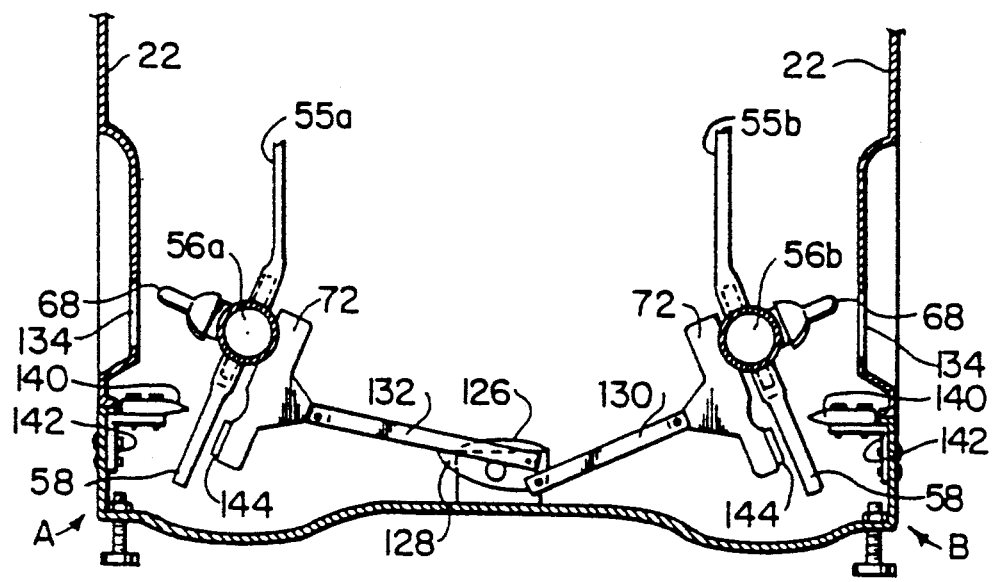
FIG. 9 is a cross-sectional view of the nipple bars, showing the nipple bar protractor in side view.

As may be seen in FIGS. 8 and 9, nipple bars 56a and 56b are supported by nipple bar supports 72. The nipple bars 56a and 56b are preferably rigid plastic pipes provided with fittings for four equally spaced nipples. Each nipple bar is supported on its inner end by a central support 138, and on its outer end by locking and leveling knobs 70 and 73 (see FIG. 3). The terminal fittings 71 on the outer end of each nipple bar are preferably permanently affixed to the bar through gluing or plastic welding. The inner end of each bar is provided with an annular groove which accommodates a rubber O-ring (not illustrated). The O-ring forms a liquid impervious seal between the central support 138 and the inner ends of each nipple bar 56a and 56b so that the bars are quickly and easily removed for thorough cleaning.

The nipple bar supports 72 are pivotally mounted to support lugs 75 which are molded to the inner walls of housing 22. The nipple bar supports 72 are normally pivoted inwardly by the nipple bar protractor mechanism (see FIG. 9) so that nipples 68 are not accessible to piglets having access to the nursing apparatus. The nipple bar protractor mechanism is powered by a reversible electric direct current motor 126. Affixed to the shaft of direct current motor 126 is a nipple bar protractor plate 128 which is preferably a substantially rectangular steel plate having a rounded lower corner to permit the rotation of the plate in a counter-clockwise direction. Pivotally affixed to the square end of the plate are a pair of protractor rods 130 and 132 respectively which pivot the nipple bar supports 72 from the position illustrated in FIG. 9 to a position parallel with the sides of housing 22 wherein nipples 68 extend through the holes 134 in housing 22. Nipples 68 are only extended through holes 134 during the four minute nursing period of each hourly feeding cycle. It should be noted that the nipple bar protractor mechanism serves the further function of opening and closing a drain tube 58 attached to a fitting on the bottom of the central support 138 of the nipple bar support 72. As will be apparent from an inspection of FIG. 9, when nipple bar supports 72 are in their normal retracted position the two drain tubes 58 are in an open condition. However, when the nipple bar supports 72 are pivoted so that nipples 68 project through holes 134, the nylon wedges 140 which are affixed to L-shaped brackets 142 pinch the silicone tubes 58 against stainless steel backing plates 144 so that liquid feed formula is trapped within the nipple bars 56a and 56b and distributed to nipples 68 during the nursing period. After the nursing period has elapsed and nipple bar supports 72 are pivoted back to their retracted positions shown in FIG. 9, drain tubes 58 are open for draining any remaining formula and for permitting the free passage of rinse water as will be described hereinafter in more detail.

FIGS. 10–13 are block diagrams of the solid state control circuits for a nursing apparatus in accordance with the invention. Those skilled in the art of solid state circuitry will immediately appreciate the fact that a number of different circuits can be constructed to perform the functions defined by the diagrams in FIGS. 10–13. Although all control circuits in the preferred embodiment of the invention are "hard logic" circuits, a microprocessor could also be used with equal success to execute the logical control operations of the apparatus.

Figure 10:
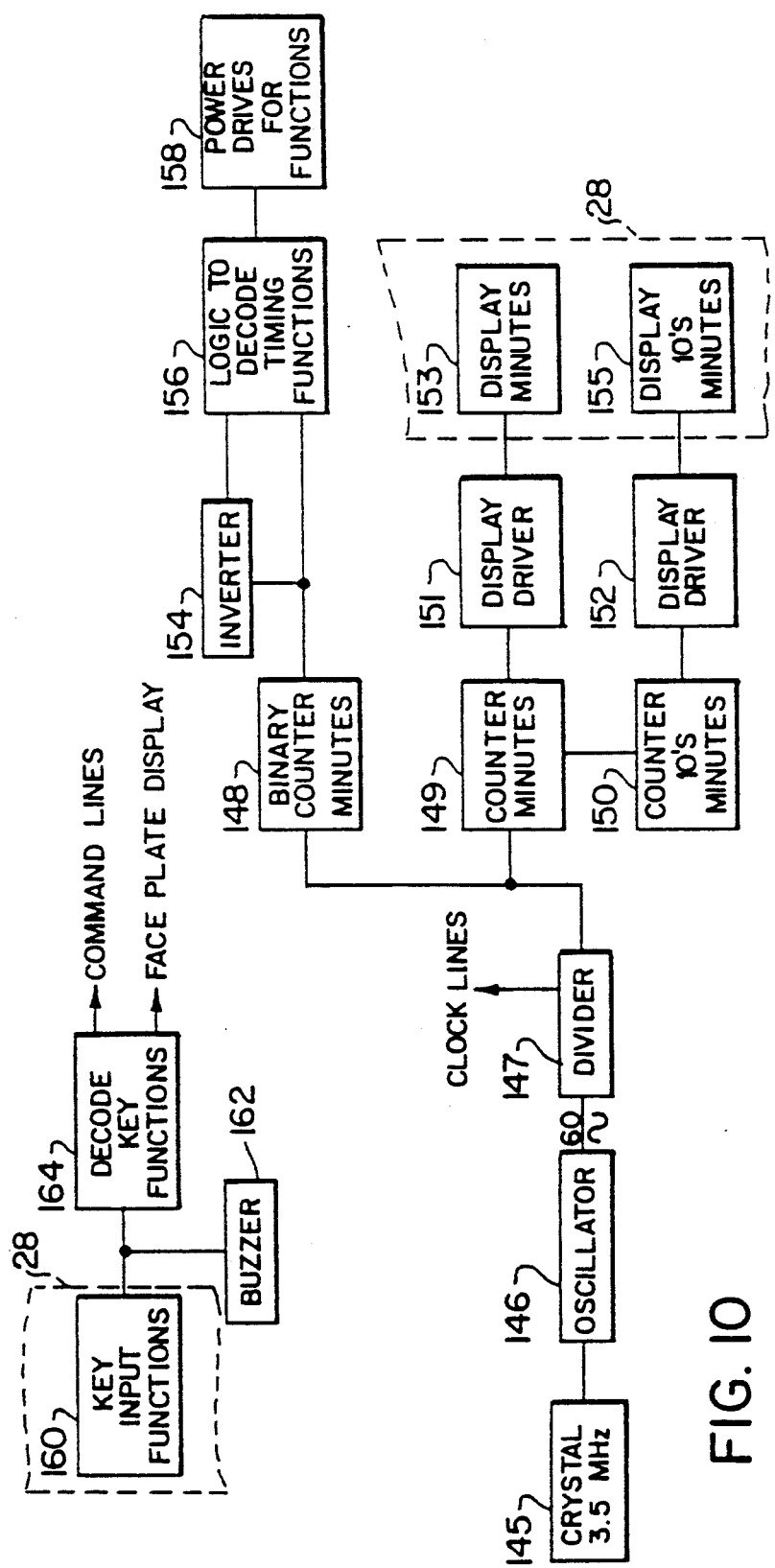
FIG. 10 is a block diagram of the primary electronic control circuit of the apparatus shown in FIG. 1.

As shown in FIG. 10, the principle timing signal for the control circuitry is provided by a quartz crystal 145 which oscillates at 3.5 megahertz. The signals from the quartz crystal 145 are fed to an oscillator 146 which outputs 60 hertz to a divider circuit 147, which is conveniently a twelve bit binary counter in connection with the logic gates required for converting the counting signals to minutes. Output from divider circuit 147 is channeled to both a binary counter 148 and a pair of decimal counters 149 and 150. Binary counter 148 tallies a binary count of minutes for driving the hard logic circuits which power the various functions of the apparatus. Decimal counter 149 counts minutes which are processed by display driver 151 to display minutes with a seven bit LED (light emitting diode) display 153 on the operator control panel 28. Decimal counter 150 counts tens of minutes and outputs signals to a display driver 152 which drives a similar seven bit LED display 155 on operator panel 28.

Binary counter 148, preferably a twelve bit binary counter, is connected to an inverter circuit 154 and a hard logic circuit 156 which controls the power drives 158 for all functions of the apparatus. The hard logic circuit 156 includes "and" gates, "or" gates and latches for controlling functions which are powered for a specific period of time. The functions controlled by the power drives 158 include the reset line, the electric motor 116 which drives the stirring pellet 114 in storage tank 30; the peristaltic pump motor 96; the heat lamps (described below in relation to FIG. 14); the digitized grunting sounds which are discussed in more detail hereinafter in relation to FIG. 12; the electric direct current motor 82 which controls the heat tank drain valves 90; the nipple bar protractor motor 126; and, the flush water control valve 48.

The upper lefthand corner of FIG. 10 is a schematic representation of the remainder of the main control circuitry of the apparatus. This circuit includes key input functions 160 which are likewise located on the control panel 28, a warning buzzer 162 to warn the user of improper key sequences are selected, and a key function decoding circuit 164 which drives command lines and the LEDs on the control panel display. The nursing apparatus has only two user controllable functions. Those include the loudness of the digitized grunting sounds and the quantity of liquid feed formula supplied to each side of the nursing apparatus during each hourly nursing period. The key inputs include a touch sensitive "auto/manual" switch (not illustrated) on the operator's control panel 28, a touch sensitive "manual step" switch located adjacent the auto/manual switch, and touch sensitive left-arrow and right-arrow switches for incrementing and decrementing values.

The key function decoding circuit is arranged to open the proper command line to operator control when the clock display on the operator panel displays a specific minute reading. The clock may be advanced in one minute increments by pressing the auto/manual key to put the control circuit into manual mode. Pressing the "manual step" key then advances the minute display in one minute increments. The volume of the digitized grunting sounds may be controlled when the clock is be set to read twenty-five minutes using the procedure outlined above. The loudness of the digitized grunts is then adjusted by pressing either the right or left-arrow keys. The left-arrow key decreases the loudness and the right-arrow key increases the loudness of the digitized grunting sounds.

The volume of liquid feed formula which is supplied to each side of the apparatus is adjusted using a similar procedure. The control circuit is first put into manual mode by pressing the auto/manual key. The clock display is then advanced to a one minute reading so that the quantity of formula supplied to side "A" may be adjusted. The control circuit is then returned to automatic mode and the manual step key is depressed while either the left-arrow or right-arrow is repeatedly depressed until a formula volume display LED array (not illustrated) on the operator's control panel 28 displays the desired quantity of formula in milliliters (mls). Each time the left-arrow is depressed, the volume of formula is decremented by 10 mls and each time the right-arrow is depressed, the volume is incremented by 10 mls. The range of acceptable volumes is 0 to 500 mls. Any attempt to exceed 500 mls is ignored. Likewise, any attempt to decrement the volume below 0 mls is ignored. A buzzer 162 sounds each time the operator depresses a key to indicate valid key contact since the sealed touch sensitive keyboard of operator console 28 does not provide any tactile signal of valid key contact. Side "B" is set using the same procedure with the exception that the clock display must be set at 10 minutes before the adjustment can be made. All other functions of the nursing apparatus are automatically controlled by the hard logic circuit 156.

Figure 11:
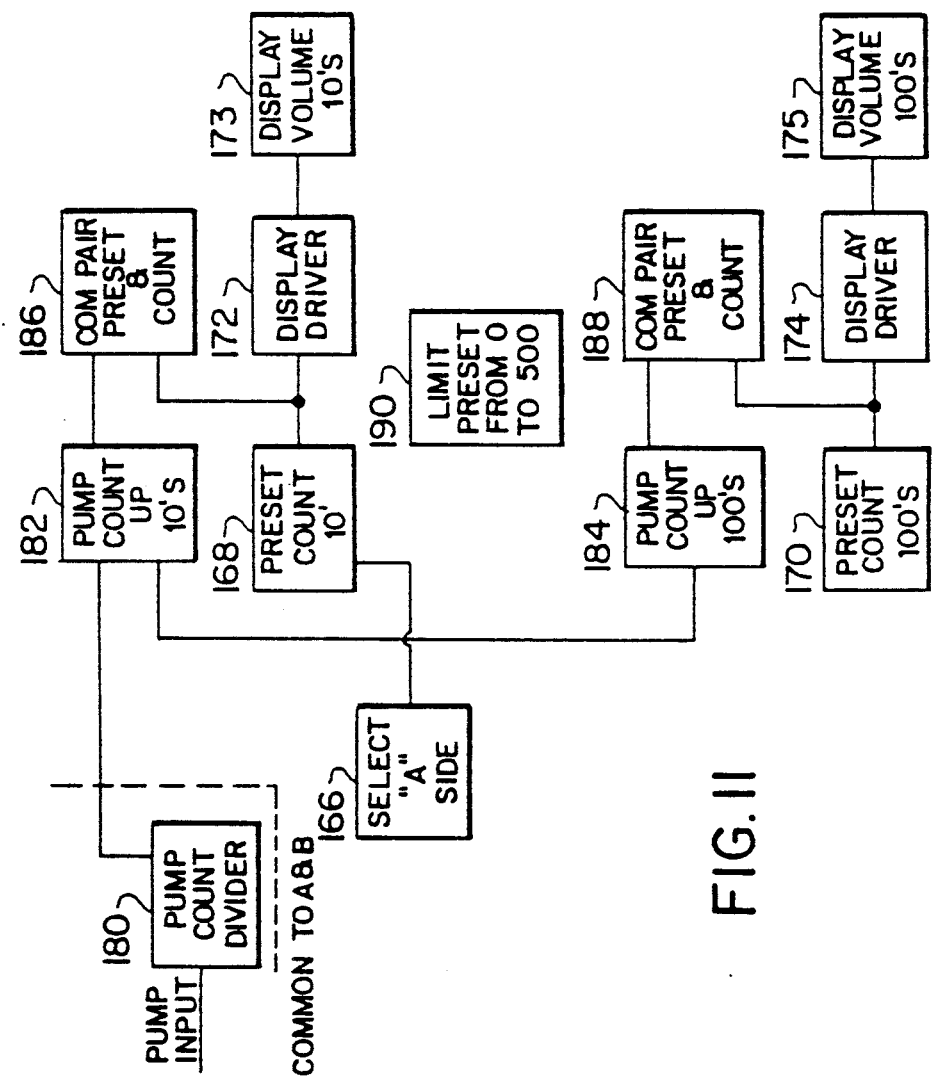
FIG. 11 is a block diagram of the peristaltic pump control circuit for the apparatus of FIG. 1.

FIG. 11 is a schematic diagram of the circuitry which controls the volume of liquid feed formula delivered to the heating tank on the "A" side of the apparatus. The circuitry for the "B" side is identical to the "A" side. The circuitry includes a side selector circuit 166, the principle component of which is a buffer chip connected with a simple logic circuit. The circuitry further includes a decimal counter 168 for storing the 10's portion of a preset, adjustable, formula volume. A second digital counter 170 stores the 100's portion of the preset formula volume. Counters 168 and 170 are connected with display drivers 172 and 174 respectively which drive seven bit LED displays 173 and 175 respectively on control panel 28 to display the selected volume of formula for the "A" side of the apparatus. When the peristaltic pump motor 96 is actuated by hard logic circuit 156, the Hall Effect sensor 154 outputs signal pulses to a pump count divider circuit 180 which is common to both the "A" and "B" side circuits. The pump count circuit includes a decimal counter and a four line anded resistor circuit which must be jumper wired in accordance with the volume delivered by each revolution of pump. Preferably, the circuit is wired so that each count signal equals ten milliliters of formula pumped. Signals from the pump count divider are tallied by a decimal counter 182 which counts 10's of milliliters, and a decimal counter 184 which counts 100's of milliliters. When side "A" is selected in automatic mode by the control logic circuit 156, a comparater 186 constantly compares the count in decimal counter 182 with the preset count in decimal counter 168, and a comparater 188 compares the count in decimal counter 184 with the preset count in decimal counter 170. When both comparators 186 and 188 indicate a matched condition, a signal is sent to the hard logic circuit 156 which cuts power to the peristaltic pump motor 96. The "A" side control circuit also includes a simple hard logic circuit 190 to limit the preset volume to a range of 0 to 500 mls.

Figure 12:
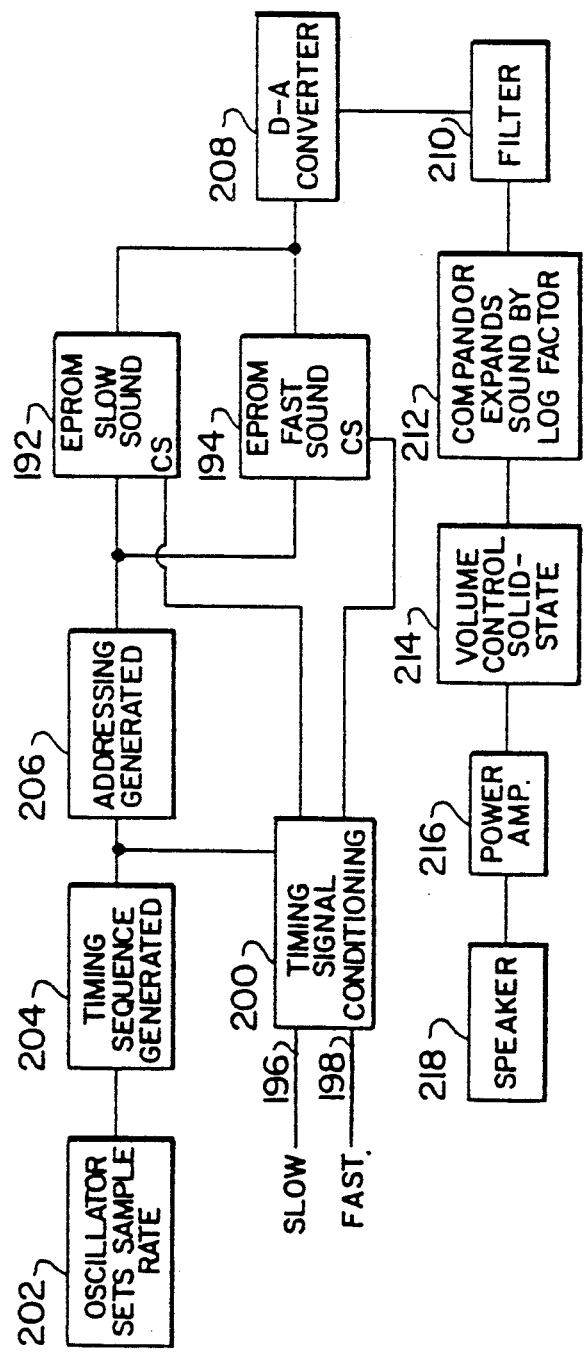
FIG. 12 is a block diagram of the digitized grunting sound generation circuit for the apparatus of FIG. 1.

FIG. 12 is a schematic diagram of the control circuitry for producing the digitized grunting sounds which are reproduced by the nursing apparatus during nursing periods. As noted above, slow grunts are reproduced to call the piglets for nursing and fast grunts are reproduced when the nursing formula is let down to the nursing nipples. Each digitized grunting sound is stored in an EPROM (erasable programmable read only memory) chip. The slow grunting sound is stored in EPROM 192 and the fast grunting sound is stored in EPROM 194. The sound is turned on by the hard logic control circuit 156 which enables either the slow sound line 196 or the fast sound line 198 via a timing signal conditioner 200. The rate for sampling the appropriate EPROM is established by an oscillator 202. Signals from oscillator 202 are processed in a flip/flop circuit 204 which generates a timing sequence. The timing sequence is used to generate EPROM addresses in the addressing circuit 206 which preferably includes a 12 bit binary counter. Signals from addressing circuit 206 are used to read the proper register from EPROMS 192 or 194 while control signals from the timing signal conditioner 200 effect the read operation. Data read from each respective EPROM is fed to a digital to analog converter 208. The analog output from the D/A converter 208 is fed to a filter 210 to remove electrical noise from the signal, and subsequently to a compandor 212 which expands the sound by a log factor of 10. The expanded sound is processed through a solid state volume control circuit 214 and fed to a power amplifier 216 which outputs signals to a waterproof speaker 220. This digitized sound reproduction circuit thus has no moving parts and permits the repeated reproduction of sound without the inherent problems of maintaining sound recording tapes, and tape replay equipment in the hostile environment of a livestock barn.

Figure 13:
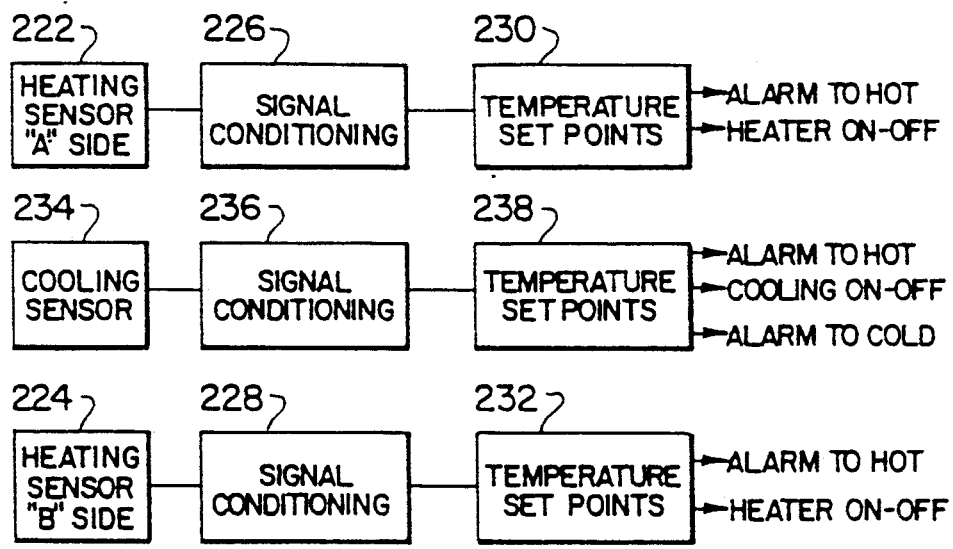
FIG. 13 is a block diagram of the temperature control circuits for the heating tanks and the storage tank of the apparatus of FIG. 1.

FIG. 13 is a schematic diagram of the circuits for controlling the temperature of liquid formula in the cooling tank and the heating tanks. Each heating tank has a heat sensor 222 and 224 respectively. Signals from the heat sensors 222 and 224 are passed through conditioning circuits 226 and 228 respectively. Conditioned signals are fed to preset temperature range control circuits 230 and 232 respectively which control heater operation and turn on an alarm light on operator control panel 28 if the preset temperature range is exceeded.

The cooling tank control circuit operates in much the same manner. Signals from a temperature sensor 234 are fed to a signal conditioning circuit 236 and processed in a temperature control circuit 238 which is provided with a preset upper and lower limit. The cooling temperature control circuit 238 controls the operation of the three refrigeration units 120 and turns on the appropriate alarm light on the operator's control panel 28 if the fluid formula in the tank becomes either too hot or too cold.

Figure 14:
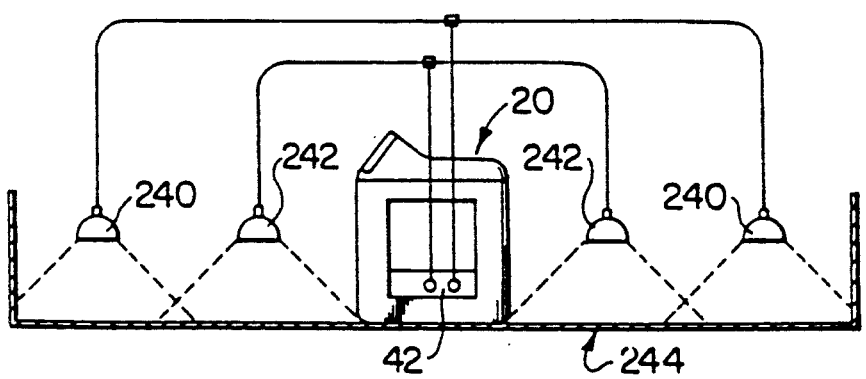
FIG. 14 is an end elevational view of the apparatus shown in FIG. 1 with heat lamps installed in accordance with the preferred arrangement for the operation of the apparatus.

FIG. 14 illustrates the apparatus installed in a typical weaner deck, generally indicated by reference 244. As previously noted, the apparatus is provided with a switched electrical outlet 42. Outlet 42 is in turn provided with two independently controlled electrical receptacles. Each receptacle is connected to a pair of heat lamps 240 and 242. Heat lamps 240 are suspended over rest areas as remote from the nursing apparatus 220 as space will permit. Heat lamps 242 are suspended on each side of the apparatus directly over the nursing area. These lamps are alternately operated as previously explained to condition piglet behavior with respect to the nursing apparatus.

In use, the apparatus is operated in the following manner. Once each day, enough liquid feed formula is prepared to meet the needs of the nursing piglets for a twenty-four hour period. Up to sixteen piglets may be simultaneously supported by each nursing apparatus 20. Eight nipples are provided on each side of the apparatus and therefore up to eight piglets may nurse simultaneously on each side. The premixed formula is placed in storage tank 30 where it is kept in a refrigerated condition. As noted above, the nursing apparatus operates on an hourly cycle. The cycle progresses in accordance with the following schedule:

0-9 minutes—formula is pumped into warming tank A
9-18 minutes—formula is pumped into warming tank B; warming of tanks A and B progresses;
24 minutes—rest area lamps 240 are turned off; nursing area lamps 242 are turned on; nipple protractor motor 126 is actuated to project nipples through nipple holes 134 in housing 22;
25 minutes—slow grunts are started to call piglets for nursing;
26 minutes—fast grunts are started and valves 90 are opened to release heated formula to nipple bars 55a, 55b, 56a and 56b;
27 minutes—slow grunts replace fast grunts;
28 minutes—slow grunts stop; the nursing area lamps 242 are turned off; the rest area lamps 240 are turned on; the nipples are retracted back inside housing 22;
30 minutes—the rinse water valve is opened and the heating tanks and nipple bars are rinsed (requires 2 minutes);
30-60 minutes—apparatus is in wait state.

In addition to the above cycle, the formula in the cooling tank 30 is stirred on a 3 minutes on, 3 minutes off basis.

Once each 24 hours the apparatus must be more thoroughly cleaned in order to eliminate any bacterial contamination. In order to clean the apparatus, any formula left over after the 24 hour cycle must be drained from storage tank 30. This is accomplished by depressing drain control switch 110 located on the top left hand corner of housing 20 (see FIG. 2). Once storage tank 30 is drained, a small quantity of disinfectant is poured into the storage tank and the apparatus is manually stepped through a nursing cycle to flush the disinfectant through the peristaltic pump tubing 53, the heating tanks 32a and 32b and the nipple bar. Nipple bars 56a, and 56b are then removed from both sides A and B by unscrewing locking knobs 70 and pulling the ends of the bars from the centre nipple bar support 138. A complete spare set of four nipple bars are preferably kept in stock so that one set may be soaked in disinfectant while the other set is in use, since the interior of the nipple bars are relatively difficult to clean because of the inaccessability of the interior of the nipples, etc., they are best cleaned by soaking.

After the nursing apparatus is cleaned, the storage tank 30 is refilled with a 24 hour supply of formula and reset to begin an hourly feeding cycle.

It is apparent from the foregoing that a novel, reliable and efficient apparatus for nursing neonatal piglets is provided by the present invention.

Changes and modifications in the specifically described embodiments can be carried out without departing from the scope of the invention which is intended to be limited only by the scope of the appended claims.

The embodiments of the invention in which an exclusive property or privilege is claimed are defined as follows:

1. A mechanical nursing apparatus for piglets comprising:
   a housing having sides, ends and a top surface for surrounding and supporting components of said apparatus, said housing having a top cover and an operators panel in electrical connection with an electronic logic circuit for controlling the nursing apparatus;
   a refrigerated fluid storage tank disposed beneath said top cover for storing a volume of fluid feed formula sufficient for an extended period of time, said storage tank being provided with a stirrer for periodically agitating fluid feed formula in said storage tank;

at least one heating tank for heating fluid feed formula to a temperature suitable for nursing, said tank being large enough to accommodate the fluid feed formula for a single feeding;

a pump disposed between said storage tank and said heating tank for transferring a metered volume of fluid feed formula to said heating tank, said pump being operated by said electronic logic circuit so that said metered volume corresponds to a preselected volume set in said electronic logic circuit by an operator at said operators control panel;

at least one nursing nipple bar for supporting at least one nursing nipple and distributing heated liquid feed formula to said at least one nipple;

a nursing nipple bar support pivotally mounted to brackets disposed within said housing and pivotable from a normal first position wherein said at least one nipple is within said housing and protected from piglets to a second position wherein said at least one nipple projects through at least one opening in said housing to permit at least one piglet to nurse;

means for pivoting said nipple bar support from said first to said second position and back again, said means for pivoting said nipple bar support being responsive to signals from said periodic nursing periods;

means for generating grunting sounds of a nursing sow during said periodic nursing period; and first and second electrical receptacles disposed on said housing and controlled by said electronic logic circuit so that said first receptacle is energized with electrical power between nursing periods and said second receptacle is energized with electrical power during said nursing periods, said first receptacle being provided to power said rest area lamp remote from the nursing apparatus and said second receptacle being provided to power a nursing lamp in a vicinity of at least one nipple of said nursing apparatus.

2. The mechanical nursing apparatus as in claim 1 wherein said storage tank is refrigerated by at least one solid state refrigeration unit.

3. The mechanical nursing apparatus as in claim 1 wherein said pump comprises a peristaltic pump having at least one magnet affixed to its drive shaft, and a sensor adjacent said shaft for detecting the passage of said magnet to thereby provide a count of the revolutions of said pump to said electronic logic circuit for metering the fluid feed formula transferred from said storage tank to said heating tank.

4. The mechanical nursing apparatus as in claim 1 wherein the nipple bar support for supporting said nipple bar, is pivotally mounted within said housing and pivoted by a reversible direct current electric motor connected thereto by a mechanical linkage which includes a plate affixed to the shaft of the motor and an arm interconnecting the plate and the nipple bar support.

5. The nursing apparatus as in claim 4 wherein said housing comprises a rectangular box structure having vertical side walls and a horizontal top surface which includes a hinged top cover and an operator's control panel adjacent said hinged cover, said operators control panel having touch sensitive control keys for inputting data to said electronic logic circuit.

6. The nursing apparatus as in claim 1 wherein said refrigerated storage tank is insulated with a foam insulation applied to exposed areas of an exterior of said tank.

7. The nursing apparatus as in claim 1 wherein said stirrer for agitating the fluid feed formula in said tank comprises a magnetic stirrer which includes a plastic coated steel pellet disposed within said tank, en electric motor vertically disposed beneath the center point of the bottom of said tank, a bar magnet affixed to the end of the shaft of said motor so that it lies in a horizontal plane parallel with the bottom of said tank, the magnetic field of said bar magnet causing the rotation of the plastic coated steel pellet when said bar magnet is rotated by said motor.

8. The nursing apparats as in claim 7 wherein the means for agitating the fluid feed formula is automatically operated on a three minutes on, three minutes off schedule.

9. The mechanical nursing apparatus as in claim 1 further including an inlet pipe connectable to a fresh water supply for rinsing components of the apparatus exposed to heated liquid feed formula, said inlet pipe being provided with an electrically controlled valve means for enabling flow through said pipe, and said pipe being in fluid communication with said means for distributing liquid feed formula and said heating pot so that each may be rinsed with fresh water after each nursing period.

10. The nursing apparatus as in claim 1 wherein the apparatus includes two nursing nipple bars disposed within and adjacent the respective sides of the housing, and two heating tanks for heating liquid feed formula for each of the two nursing nipple bars.

11. The nursing apparatus as in claim 10 wherein the electronic logic circuit operates the apparatus on a schedule, comprising:
 a) pumping liquid feed formula into the warming tank for the nipple bar on a first side of the housing;
 b) pumping liquid feed formula into the warming tank for the nipple bar on a second side of the housing;
 c) heating the formula in each heating tank;
 d) turning off the first electrical receptacle so that the rest area lamp is extinguished;
 e) turning on the second electrical receptacle so that the nursing lamp is lit;
 f) activating the means for pivoting said nipple bars so that said at least one nipple is extended through said at least one opening in the housing;
 g) energizing the means for generating grunting sounds of a nursing sow to call the piglet;
 h) releasing heated formula to the nipple bars for distribution to the at least one nursing nipple;
 i) turning off the second electrical receptacle after a given nursing period to extinguish the feeding area lamp;
 j) retracting said at least one nipple back into the housing;
 k) turning on the first receptacle so that the rest area lamp is lit;
 l) opening a rinse water valve to introduce rinse water to the heating tank and the nipple bars;
 m) waiting for a fixed time interval before recommencing the cycle.

12. The apparatus as in claim 11 wherein the schedule is a fixed hourly schedule, comprising:
 a) 0-9 minutes—fluid feed formula is pumped into the first warming tank b) 9-18 minutes—fluid feed formula is pumped into the second warming tank; warming of the fluid feed formula in each tank continues;
c) 24 minutes—rest area lamp is extinguished; nursing area lamp is lit; the at least one nursing nipple is projected through the at least one opening in the side of the housing;
d) 25 minutes—the grunting sounds of nursing sow are generated at a slow rhythm;
e) 26 minutes—the grunting sounds of a nursing sow are generated at a fast rhythm and the heated liquid feed formula is released to the nipple bars for distribution to said at least one nipple;
f) 27 minutes—the grunting sound of nursing sow are again generated at the slow rhythm;
g) 28 minutes—the generation of grunting sound is terminated; the second electrical receptacle is turned off to extinguish the feeding area lamp, and the first electrical receptacle is turned so that the rest area lamp is lit;
h) 30 minutes—a rinse water control valve is opened to introduce rinse water which is flushed through the heating tanks and the nipple bars; and
i) 30-60 minutes—a wait state is executed.

* * * * *